KIYOSHI INOUE
INVENTOR.

United States Patent Office 3,364,333
Patented Jan. 16, 1968

3,364,333
METHOD OF AND APPARATUS FOR BONDING TOGETHER METALLIC PLATES
Kiyoshi Inoue, 182 3-chome, Tamagawayoga-machi, Setagaya-ku, Tokyo, Japan
Continuation-in-part of applications Ser. No. 247,387, Dec. 26, 1962, and Ser. No. 319,821, Oct. 29, 1963. This application Jan. 27, 1964, Ser. No. 340,211
Claims priority, application Japan, Jan. 25, 1963, 38/3,498; Feb. 18, 1963, 38/8,232; Apr. 5, 1963, 38/18,360
8 Claims. (Cl. 219—91)

ABSTRACT OF THE DISCLOSURE

A method of and apparatus for welding together metallic plates whereby a pair of electrodes apply a welding current through the plates transverse to their contact interface while a magnetic field is applied obliquely to this interface and to the line of current flow between the electrodes by at least one pair of magnetic poles diagonally disposed with respect to the electrodes on opposite sides of the plates and adjacent the electrodes. There is also disclosed methods of and apparatuses for bonding, into substantially homogenous coherent bodies, particles of electrically conductive particles (1) compacted by electrostatic charges prior to heating by and between electrodes or in a furnace, or (2) compacted by and between electrodes and in a magnetic field at right angles to the sintering current.

---

My present invention relates to a method of and an apparatus for the bonding together of metallic bodies and is a continuation-in-part of my copending applications, Ser. Nos. 247,387, 319,821 (now U.S. Patents Nos. 3,250,-892 and 3,241,956) and 326,837, filed Dec. 26, 1962, Oct. 29, 1963 and Nov. 29, 1963, respectively, relating to the fusion or sintering of discrete particles into coherent bodies by spark discharge and the passage of electric current through the particle mass, and is somewhat similar to my application Ser. No. 225,270 filed Sept. 21, 1962 (now U.S. patent No. 3,234,353) relating to the welding of macrobodies with the aid of magnetically permeable devices for the orientation of the electric-current flow through the bodies.

In my above-identified copending applications concerned with the fusion of particulate materials with the aid of spark discharge and resistance or joule heating of the particle mass, I disclose a phenomenon whereby the excessive pressures applied heretofore in the sintering of metallic particles or bodies can be eliminated and the impulsive force of the spark discharge exploited to produce coherent bodies of any desired degree of porosity, control of the latter being effected by proper selection of the sintering parameters, namely, particles size, spark power or intensity, postfusion pressure and regulated interruption of the supply current. In the aforementioned application relating to the interfacial welding of metallic plates and the like, it is pointed out that a magnetically permeable body can be disposed forwardly of the electrodes, in the direction of propagation of the weld in order to insure a concentration of electric current at those interfacial regions at which binding is yet to be effected and to divert current flow away from previously welded portions of the interface.

It has been found that the fusion (e.g. sintering or welding of juxtaposed bodies along a common interfacial surface) by conventional methods, i.e. merely by passage of an electric current through these bodies in a direction transverse to the surface, frequently results in irregular bonding of the bodies presumably, to a large extent, due to the formation of oxide films in the interfacial regions and an incompletely understood concentration of ionic fragments in the region in which the major part of the electric current is concentrated. These ionic fragments may derive from ionization of gas in the region of the interface or the discharge of ionically charged particles by one and/or the other body to be welded. In any event, these problems are characterized by a somewhat nonuniform degree of bonding of the bodies along the interfacial surface and, for example when a series of spot welds are carried out along an interface with a constant current amplitude, contact pressure and welding duration, the strength of the weld is found to differ materially from spot weld to spot weld with variations sometimes in excess of 100% in the strengths being observed. In the fusion of discrete particles into coherent bodies, the latter are frequently characterized by nonhomogeneity with respect to their porosity with, for example, a central region of relatively high density (i.e. low porosity) and a peripheral region of relatively low density (i.e. high porosity). Whereas in certain cases such nonhomogeneity is desirable, sometimes the lack of homogeneity prevents satisfactory use of the sintered body and requires complex steps to produce homogeneous articles.

It is, therefore, the principal object of the present invention to provide a method of bonding together metallic bodies wherein the uniformity and constance of strength of the bond is improved.

A more specific object of this invention is to provide a method of electrically sintering discrete particles into a coherent and substantially homogeneous article.

A further object of this invention is to provide a method of welding together one or more macrobodies, such as metal plates, along a common interface wherein the strength of the weld from point to point along the interface will be more or less uniform.

Still another object of this invention is to provide apparatus for carrying out the foregoing improved methods.

Yet a further object of this invention is to provide a method of forming coherent articles from discrete fusible particles with the aid of a minimum of mechanically applied external pressure.

The foregoing objects and others which will become apparent hereinafter are attained, in accordance with the present invention, by providing a method of bonding together metallic bodies wherein an electric current is passed between these bodies substantially concurrently with the application thereto of a magnetic field having at least one component transverse to the direction of flow of the electric current between the bodies. I have found that the use of such a magnetic field, for reasons which are not wholly clear but which may in part derive from an apparent spreading of the electric current in the region of the contact interface by virtue of the displacement of this path to opposite sides of an axis or a spreading of the ionic fragments produced thereat, not only augments the strength of the bond but also renders the bonds formed in this manner markedly more uniform than the bonds between bodies produced when a current of identical magnitude is passed between the bodies in the absence of this externally applied magnetic field. It is axiomatic that the electric current passed through the bodies must be of an intensity sufficient to effect a fusion of the bodies at their interface either by melting and/or ionizing limited contact areas of the bodies to permit their thermal bonding or by producing an interdiffused zone at the interface. It is an important feature of the present invention that the electric current passes through the bodies in a direction substantially perpendicular to the interfacial surface and that the magnetic field should be applied athwart the electric current, i.e. in a direction primarily transverse to the direction of flow of this current. I have found that best results are obtained when the magnetic field intersects the direction of flow of the electric current at an angle ranging between substantially 15° and 165° and between 15° and 45° when the bodies to be bonded together are plates through which the electric current passes perpendicularly. When the metallic bodies are pairs of particles of a mass of such particles, the direction of the magnetic field can be such that the field intersects the electric-current direction at an angle of about 90°.

According to a more specific feature of the present invention, the electric current passed through the bodies can be pulsed, whereupon the magnetic field is pulsed substantially in the cadence of the electric current. Thus, when the electric current is intermittent and derived from capacitive discharge for the spark-discharge sintering of discrete particles, the magnetic field can be intermittently applied during discharges. Alternatively, the pulsed current can be a sequence of electric-current surges applied during successive spot welds along a pair of juxtaposed plates which are displaceable relatively to the electrode means; again, the magnetic field is pulsed substantially concurrently with the electric current. It will be apparent that this pulsed technique, which can be effected by selected discharges of capacitors via a suitable control means, conserves electric current and electrical energy supplying the magnetic means and permits the sources or power supplies of the electrode means and the magnet means to be designed for a much lower output of electrical energy than is actually applied to the electrodes and/or magnet.

I have discovered that, when a pair of metallic plates is welded by this method, the preferred angle of intersection of the magnetic field and the electric current is about 30°, the magnetic field being applied athwart the electric current by at least one pair of opposite magnetic poles disposed diagonally on opposite sides of the plates. While these magnetic poles can constitute the pole members of a single permanent or electromagnet, it is desirable, according to the present invention, to provide a second pair of opposite magnetic poles disposed diagonally on opposite sides of the plates with one pole of each pair constituting with the opposite pole of the other pair the pole members of a single magnet.

According to still another feature of the present invention, a mass of discrete particles can be bonded into a substantially homogeneous coherent body when care is taken in the introduction of these particles into the mold or form to insure that excessive and nonuniform agglomeration of particles does not occur. More specifically, the present invention contemplates the imparting to the particles cascaded into a form of an electrostatic charge sufficient to maintain a mutual separation of the particles as they are poured into the form. The compressing force of conventional systems and even my earlier spark-discharge sintering technique can then be eliminated if the charged particles are introduced into the form under the influence of an attractive unidirectional electric field. Thus, the only compressive force on the particles of the mass in addition to the compressive force due to gravity and, indeed, the only nongravitational compression force on the articles can be the electrostatic force applied to them. According to this aspect of the present invention, therefore, the particles can be heated to a temperature sufficient to cause their fusion while being maintained under the compressive force of the electrostatic field. The heating can be carried out by the passage of an electric current through the mass or in a conventional furnace as required.

The above and other objects, features and advantages of the present invention will become more fully apparent from the following detailed description and examples, reference being made to the accompanying drawing in which.

Figure 1:
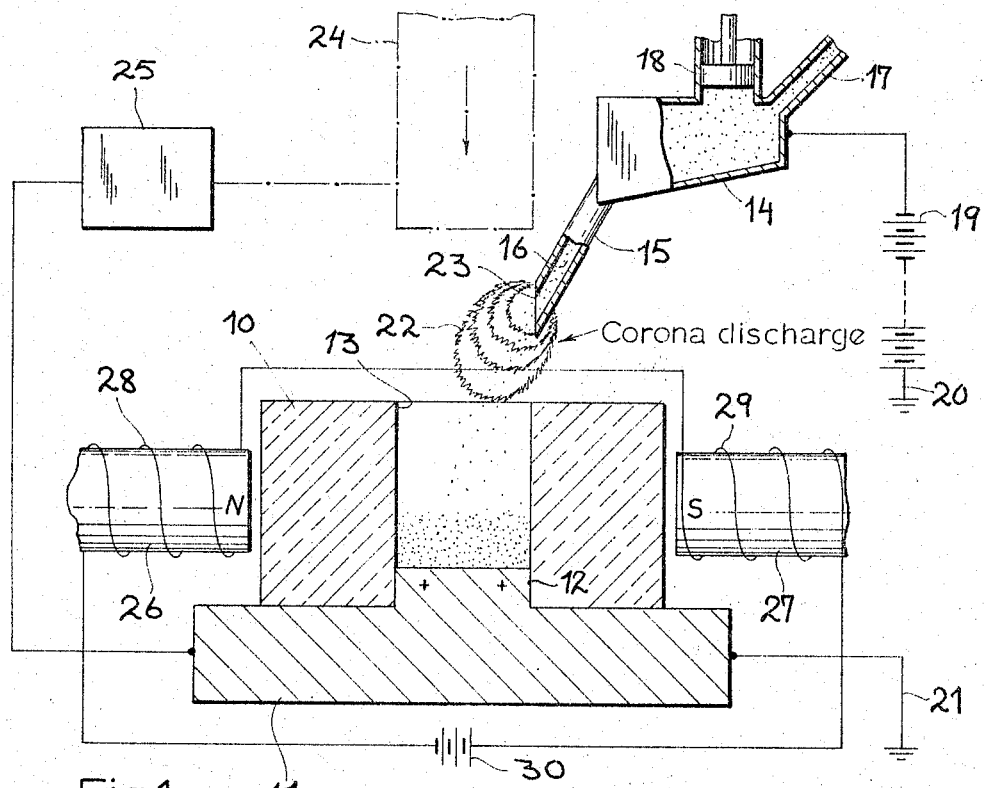
FIG. 1 is an axial cross-sectional view, partly in elevation, diagrammatically illustrating a system for filling a form with the use of electrostatic pressure according to the present invention.

In FIG. 1 I show a system which comprises a thermally insulating and nonconductive cylindrical form 10 mounted upon a conductive base 11 whose boss 12 extends into the inner cavity 13 of the form. A hopper 14 disposed above the cavity 13 has a chute 15 spaced thereabove and adapted to direct a stream of fusible particles 16 from the hopper 14 into the cavity 13. The hopper 14 is, in turn, supplied with particles via an inlet 17 and is provided with an oscillating plunger 18 adapted to meter the particles into the cavity 13. The hopper 14 is connected to the negative terminal of a source 19 of a unidirectional electrostatic field whose positive terminal 20 is grounded so that this source is bridged across the base plate 11 and the hopper, the base plate also being grounded at 21. The potential of source 19 is such that a corona discharge 22 develops at the outlet 23 of the chute 15, the resulting ionic gas particles being adsorbed by the particles 16 which are cascaded into the cavity 13. The electric charge thus adherent to the particles causes a mutual separation thereof and reduces agglomeration as these particles, of negative charge, are attracted toward the positively charged boss 12 of plate 11. The particles are thus uniformly compacted by the electrostatic field between the chute 15 and the base plate 11. While heating of the particles can be effected by raising the temperature to the fusion point in a furnace, it is also possible to use the spark-discharge method disclosed in one of my above-identified copending applications. For this purpose, a vertically movable electrode 24 is provided, a source 25 of pulsed electric current being connected between this electrode 24 and the counterelectrode formed by the base 11. In accordance with the principle of the present invention, a magnetic field is developed between the magnetic poles 26 and 27 in a direction perpendicular to the direction of current flow from electrode 24 to plate 11. Magnetic poles 26 and 27 are energized by respective windings 28, 29 connected in series with a direct-current source 30 in the usual manner.

*Example I*

A tungsten powder having an average particle size of 5$\mu$ is dispensed from the chute 15 whose outlet is at a distance of 15 cm. from the mold base 11, an electrostatic potential of 40,000 volts being applied therebetween. The diameter of cavity 13 is 25 mm. After filling of the mold, the latter is heated to a temperature of 1450° C. in ambient hydrogen for a period of 30 minutes. The resulting article is a 25 mm.-diameter cylinder of a 5 mm. in length having a specific gravity of 18.8, this parameter being uniform throughout the cross-section of the body. In order to produce a similar cylinder by heating to the same temperature for 30 minutes without electrostatic compression and by externally applied pressure, the latter must be at least 1.85 t./cm.$^2$.

*Example II*

Using the same conditions as in Example I, magnesium-oxide powder, having a particle size between 8$\mu$ and 12$\mu$, is cascaded into a mold and sintered at a temperature of about 2000° C. to form a body having a diameter of 25 mm. and a length of 50 mm. The body is found to be highly uniform with regard to the density between its center and its perimeter and of specific gravity of about 3.45. The strength against compressive and bonding forces is equal to that of a body of identical size produced by compression molding to the same specific gravity with heating to a temperature of 2000° C.

Figure 2:
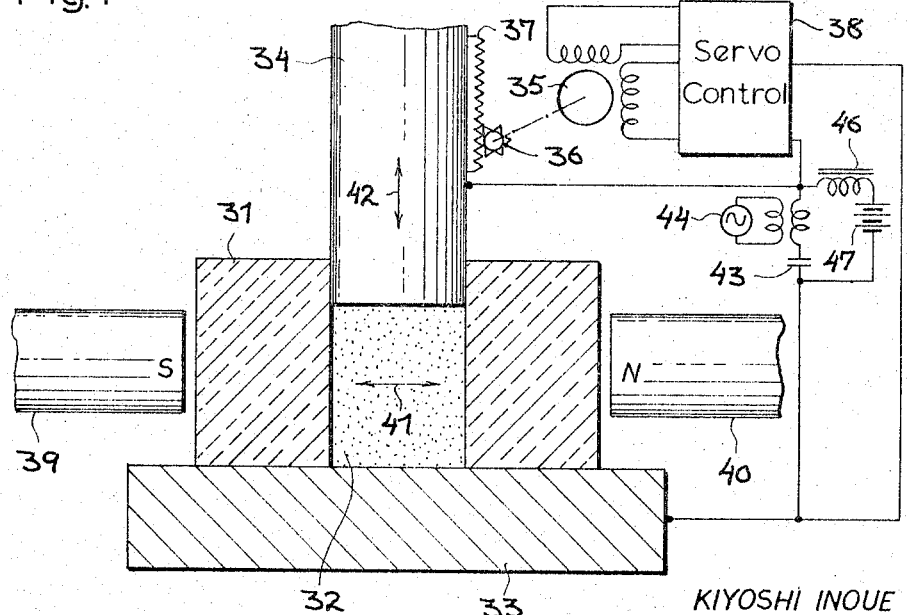
FIG. 2 is a view similar to FIG. 1 of a system for sintering metallic particles into coherent bodies.

In FIG. 2, I show a form 31 similar to that illustrated in FIG. 1 and filled with a mass of particles 32 upon a conductive base 33. An electrode 34 is fed by a servomotor 35, which drives a pinion 36 meshing with rack 37 of electrode 34, in response to the potential across the electrode means 33, 34 so that the electrode 34 follows the contraction of the particle mass 32 during the sintering process. A conventional servo-control unit 38 activates the meter 35 and is connected across the electrode means. A pair of permanent bar magnets 39, 40 develop a magnetic field in the horizontal direction (arrow 41), i.e., at an angle of 90° to the electric current (arrow 42). Initially, a spark discharge is developed across the electrode means by the discharge of a capacitor 43 connected in series with a secondary winding of a transformer 44 energized by an alternating-current source 45 to apply a high-frequency field across the electrode means for the purposes indicated in my copending application Ser. No. 326,837. Capacitor 43 is charged through a choke 46 by battery 47 as pointed out in my copending application referred to above and relating to the discharge sintering of particles.

*Example III*

A particle mass consisting of 60% by weight 100-mesh nickel hydroxide Ni(OH)$_3$ powder and 40% by weight 100-mesh nickel powder is disposed in the form 31 whose inner diameter is 25 mm. and whose height is 4 mm. A current of 32 joules/hr. is applied for a period of 6 seconds and a pressure of 1 kg. per cm.$^2$. When a magnetic field of 10 kilogauss was applied by magnetic poles 39, 40, the density of the resulting body was found to be 1.4 times as great as that obtained when no magnetic field was applied.

Figure 3:
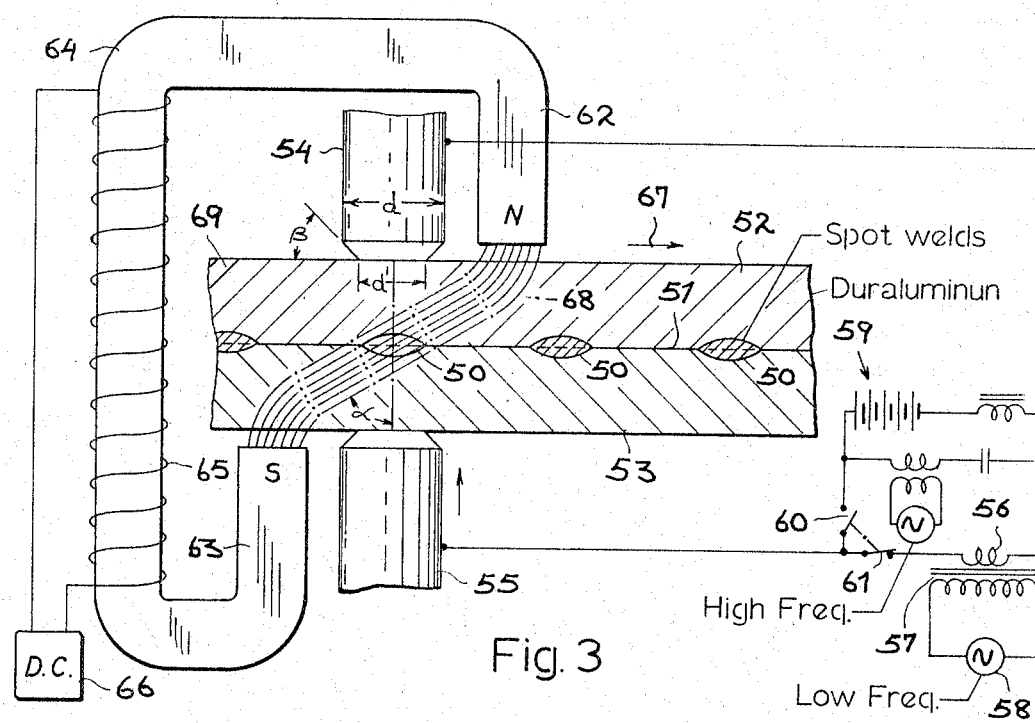
FIG. 3 is a cross-sectional view taken transversely to a pair of metallic plates to be spot-welded together along the plane of the welds, showing a modification of a system according to this invention.

FIG. 3 shows a spot-welding arrangement for effecting a plurality of successive welds 50 (represented diagrammatically) along the interface 51 between a pair of metallic plates 52, 53. The spot-welding apparatus comprises a pair of electrodes 54, 55 which can be moved in the usual manner toward and away from the plates 52, 53 to apply a compressive force thereto. These electrodes can be energized by the usual high-frequency-current secondary winding 56 of a step-down transformer 57 by low-frequency alternating current from source 58 or by the impulsive discharge from power supply 59 similar to that illustrated in FIG. 2 depending upon the position of the ganged switches 60, 61. The magnetic field is applied across the interfacial welding zone by a pair of magnetic poles 62, 63 forming oppositely poled magnetic members of a single electromagnet 64 which is energized by a coil 65 connected in series with a direct-current source 66. The latter may be pulsed in the cadence of the contact of electrodes 54, 55 with the workpieces 52, 53 which are moved relatively to the electrodes in the direction of arrow 67 in the usual manner. The poles 62, 63 are disposed diagonally on opposite sides of the plates 52, 53 in such position that the main magnetic field (dot-dash line 68) includes an angle α with the direction of electric-current flow (dot-dash line 69) ranging between 15° and 45°.

*Example IV*

A pair of Duralumin plates 52, 53, each of 1 mm. thickness, are welded together under an electrode pressure between a pair of electrodes 54, 55 whose shank diameter $d$ is 16 mm. and whose contact diameter $d'$ is 12 mm., the frustoconical tip of the electrode having a half-angle $\beta$ of 20°. The current supplied to these electrodes was 50 cy./sec. and approximately 22.5 kiloamps. The electrodes were copper and chromium while the angle α was selected to be 30°. The contact time (welding duration per spot weld) was about 200 milliseconds (10 cycles) and the strength of each weld (amount of force necessary to break bond) ranged between 180 kg. and 330 kg., with a median strength of 260 kg. A succession of 100 welds were tested.

When a magnetic field of 12 kilogauss was applied between the poles 62 and 63, a welding time of only 2 cycles (40 milliseconds) was required at a current of approximately 22.0 kiloamps to yield welds ranging in strength from 300 to 380 kg. with a median strength of 320 kg. Thus, the use of a magnetic field resulted in a 25% increase in the average strength of the bond and a decrease in the variation in strength from bond to bond from on the order of about 100% to about 15%. Moreover, the joule heating during welding, as a consequence of the reduction of the welding time, is only a third as great when the magnetic field is applied.

*Example V*

Both parts of Example IV were carried out using copper spot-welding electrodes containing 3.4% by weight of Cu$_2$O in accordance with the principles of my copending applications Ser. Nos. 281,365 and 326,837, filed May 17, and Nov. 29, 1963, respectively. In both cases, a reduction of welding pressure by about 50% resulted in the bonding strengths given by the electrodes of Example IV.

*Example VI*

The plates of Example IV were welded together in the system of FIG. 3 except that switch 61 was opened and switch 60 was closed. In this case the welding frequency supplied by the circuit 59 was 18 kilocycles per second at 23 kilogauss. The welds required approximately 10 milliseconds (i.e. 200 cycles). The use of an 18-kilogauss magnetic field at an angle α of 30° reduced the welding time to 6 milliseconds. When direct current was used for welding, similar results were obtained with a capacity discharge of 15 kilogauss.

Figure 4:
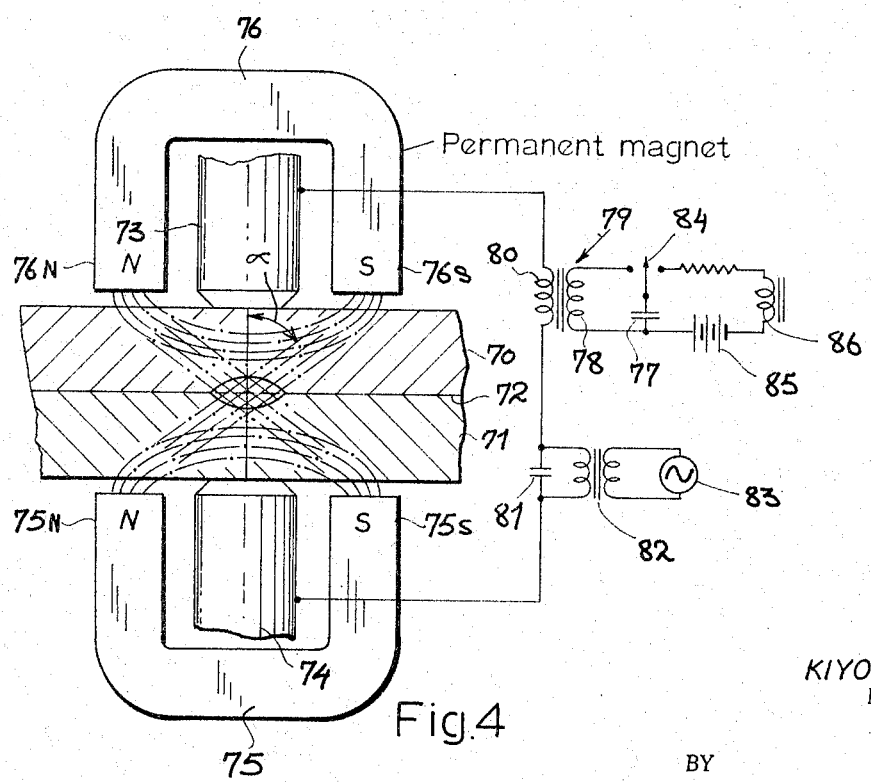
FIG. 4 is a view similar to FIG. 3 showing another spot-welding system.

In FIG. 4 I show an arrangement wherein the plates 70, 71 are welded at their interface 72 by electrodes 73, 74 as previously described. In this case the magnetic field is applied by a pair of horseshoe magnets 75, 76 whose opposite poles 75n, 76s and 76n, 75s are disposed on diagonally opposite sides of the plates 70, 71 so that the magnetic field between these pairs is at an angle α to the electric current. The latter is derived from repeated discharges of a capacitor 77 through the primary winding 78 of a transformer 79 whose secondary winding 80 is connected in series with a capacitor 81 across the electrodes 73, 74. A high-frequency alternating current may also be superimposed upon the electrodes via the coupling transformer 82 connected across capacitor 81 and energized by the high-frequency source 83. Capacitor 77 is alternately charged and discharged by means of a switch 84 by the battery 85 through an antihighfrequency choke 86 whose ohmic impedance is indicated at 87. This apparatus, of course, functions similarly to that described with reference to FIG. 3.

Figure 5:
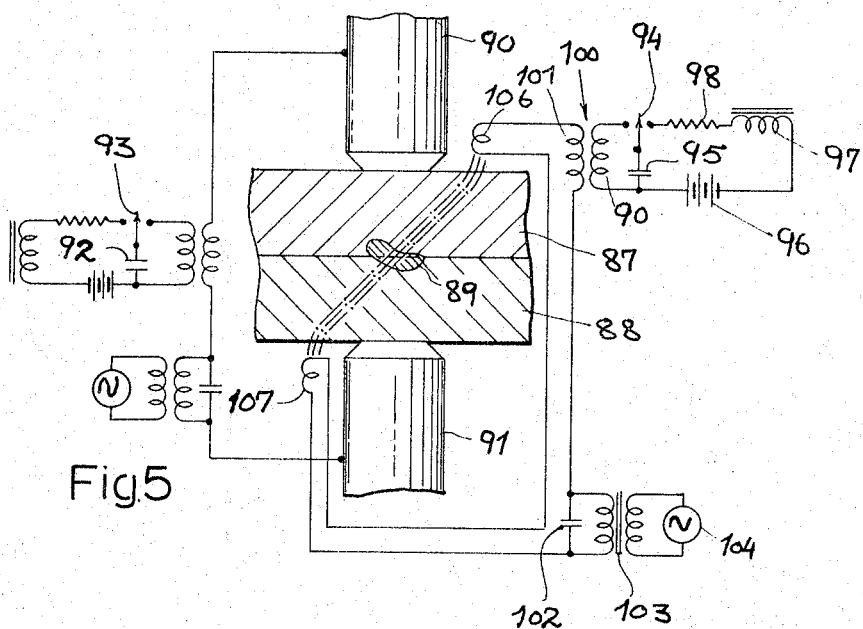
FIG. 5 is another view similar to FIG. 3 of a further welding system.

In the modification of FIG. 5, the plates 87 and 88 are welded at 89 by electrodes 90, 91, deriving an intermittent electric current from the discharge of a capacitor 92 by a switch 93 in a circuit similar to that shown in Example IV. Switch 93 can be coupled with a switch 94 of another similar circuit for alternately charging and discharging a capacitor 95 which energizes a pair of electromagnetic coils 106, 107 for applying a magnetic field in the region of the weld athwart the alternating-current flow and thus distributing the current which normally tends to concentrate at previously welded areas of the interface. Capacitor 95 can be charged by a battery 96 through the antihighfrequency choke 97 and its ohmic impedance 98 and discharged by switch 94 through the primary winding 99 of transformer 100 whose secondary 101 is connected in series with a capacitor 102 and the coils 106, 107. A transformer 103 energized by high-frequency source 104 is connected across the capacitor 102 in a manner similar to the arrangement for energizing the electrodes 90, 91 of FIGS. 4 and 5.

Figure 6:
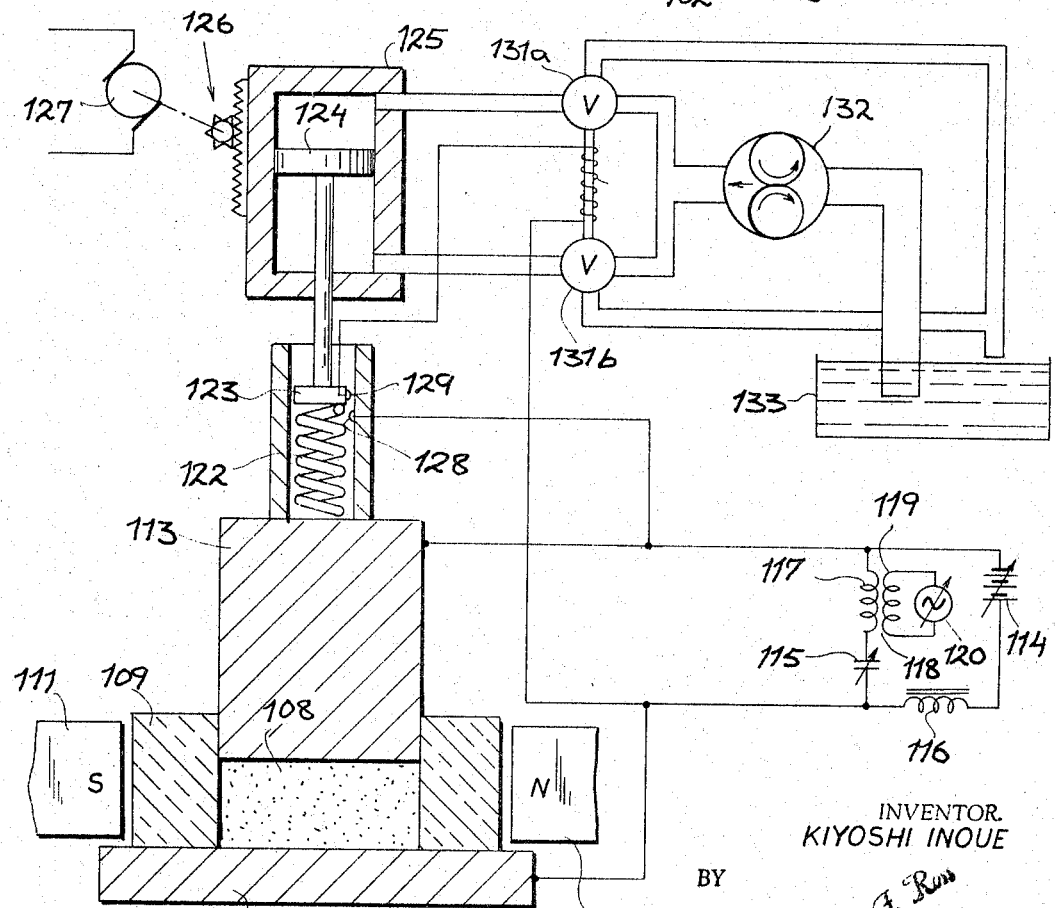
FIG. 6 is an axial cross-sectional view through a discharge sintering system embodying the invention.

In FIG. 6 there is shown an arrangement for the discharge sintering of metallic particles 108 in form 109 disposed on a conductive base 110. Again, magnetic poles 111, 112 are provided for applying a magnetic field transversely to the electric current passing through the particles from electrode 113, the latter being energized by a tapped battery 114 upon discharge of a variable capacitor 115 in series with the battery, a choke 116 and the secondary winding 117 of a coupling transformer 118 whose primary winding 119 is energized by the adjustable high-frequency source 120. The electrode 113 is surmounted by a sleeve 121 enclosing a compression spring 122 adapted to yield under the pressure of a ram 123 and serving to transmit the pressure of this ram to the electrode 113. Ram 123 is coupled with a piston 124 displaceable in a hydraulic cylinder 125, the latter having a rack-and-pinion arrangement 126 to enable positioning of the electrode 113 by a motor 127. In addition, the sleeve 121 has a stationary contact 128 co-operating with a movable contact 129 on ram 123 when a pressure of 1 kg. has been applied to the electrode 113 and by the latter to the powder 108. These contacts are adapted to energize the solenoid 130 of a dual valve 131a, 131b controlling the flow of fluid to cylinder 125 from a pump 132 and its reservoir 133.

*Example VII*

A grinding wheel was produced in an apparatus of the type illustrated in FIG. 6 from a powder consisting of 80% by weight of copper, cadmium and tin in equal parts and 20% by weight of sapphire powder, all particles being approximately 150 mesh. Electrode 113 is lowered by motor 127 and a discharge current of 42 joules/hr. applied for a period of 70 seconds with the cylinder 125 being lowered until at a spring pressure of 1 kg./cm.$^2$ contacts 128, 129 close to supply fluid to the upper part of the cylinder chamber and drive the piston 124 so as to raise the pressure supplied to the mass of particles 108 to 100 kg./cm.$^2$ during the last 3 seconds of sintering, the discharge terminating after a fraction of a second and a substantially unidirectional current of a power of 42 joules/hr. being supplied for the remainder of this time. In this case, the superimposed alternating current was dispensed with. When a magnetic field of 10 kilogauss was applied, the grinding wheel was of twice the strength of a grinding wheel produced without the magnetic field.

The invention described and illustrated admits of numerous variations and modifications known to persons skilled in the art and intended to be embraced in the spirit and scope of the invention as defined in the appended claims.

I claim:
1. A method of bonding together metallic plates, comprising the steps of juxtaposing said plates to form a common interfacial surface thereof; passing through said plates between a pair of electrodes on opposite sides of said plates an electric current in a direction generally perpendicular to said surface and of an intensity sufficient to bond said plates together at the mutual contact pressure of said plates at said interfacial surface; and, substantially concurrently with the passage of said electric current between said plates, applying across said plates between magnetic poles on opposite sides of said plates and proximal to said electrodes a magnetic field having a principal component inclined to the direction of flow of said electric current and to said surface while intersecting said direction of flow at an angle ranging between substantially 15° and 75°.

2. A method as defined in claim 1 wherein said angle ranges between substantially 15° and 45°.

3. A method as defined in claim 2 wherein said angle is about 30°.

4. A method as defined in claim 2 wherein said magnetic field is applied athwart said electric current by at least one pair of oppsite magnetic poles disposed diagonally with respect to said electrodes on opposite sides of said plates.

5. An apparatus for bonding together a pair of juxtaposed metallic plates, comprising a pair of electrodes adapted to sandwich between them the juxtaposed metallic plates, positioned to have a common interfacial surface extending generally perpendicularly to the direction of flow of an electric current passed through said plates by said electrodes; a source of electric current connectable to said electrode means; magnetic means including at least two opposite magnetic poles disposed diagonally opposite one another proximal to said electrodes on opposite sides of said plates for applying to said plates in the region of said interfacial surface a magnetic field having at least a component transverse to the direction of flow of said electric current and intersecting said direction of flow at an angle ranging between substantially 15° and 75°.

6. An apparatus as defined in claim 5, further comprising first control means for pulsing said electric current and second control means for pulsing said magnetic field substantially in the cadence of said electric current.

7. An apparatus as defined in claim 5 wherein said poles constitute the opposite pole pieces of a single magnetic member.

8. An apparatus as defined in claim 5, further comprising another pair of opposite magnetic poles disposed diagonally on opposite sides of said plates, each of the poles of each pair constituting with the opposite magnetic pole of the other pair opposite pole pieces of a respective magnetic member.

References Cited
UNITED STATES PATENTS

| | | | |
|---|---|---|---|
| 2,232,450 | 2/1941 | Hagedorn | 219—91 X |
| 2,233,526 | 3/1941 | Hagedorn | 219—91 X |
| 2,384,215 | 9/1945 | Toulmin | 219—149 X |
| 3,016,450 | 1/1962 | Keeleric | 219—91 X |

FOREIGN PATENTS 67,754 10/1957 France.

RICHARD M. WOOD, *Primary Examiner.*

R. F. STAUBLY, *Assistant Examiner.*